United States Patent [19]

Sakamoto

[11] Patent Number: 4,556,901
[45] Date of Patent: Dec. 3, 1985

[54] METHOD FOR SCANNING A PLURALITY OF SCANNING LINES AT THE SAME TIME

[75] Inventor: Takashi Sakamoto, Kyoto, Japan

[73] Assignee: Dainippon Screen Seizo Kabushiki Kaisha, Kyoto, Japan

[21] Appl. No.: 459,157

[22] Filed: Jan. 19, 1983

[30] Foreign Application Priority Data

Jan. 19, 1982 [JP] Japan ................................. 57-6650

[51] Int. Cl.⁴ .................. H04N 1/46; H04N 3/06; H04N 1/04; H04N 1/06
[52] U.S. Cl. ................................. 358/75; 358/205; 358/285; 358/289
[58] Field of Search ............... 358/199, 202, 203, 204, 358/205, 206, 207, 208, 285, 289, 292, 293, 75

[56] References Cited

U.S. PATENT DOCUMENTS

| | | | |
|---|---|---|---|
| 1,866,338 | 7/1932 | Alexanderson | 358/205 |
| 3,813,483 | 5/1974 | Kurosawa et al. | 358/281 |
| 3,947,627 | 3/1976 | Tanaka | 358/288 |
| 4,319,268 | 3/1982 | Yamada | 358/75 |
| 4,402,007 | 8/1983 | Yamada | 358/75 |
| 4,462,043 | 7/1984 | Saitou | 358/75 |

Primary Examiner—Howard W. Britton
Assistant Examiner—John K. Peng
Attorney, Agent, or Firm—Yuter, Rosen & Dainow

[57] ABSTRACT

A method for scanning an original picture photoelectrically to obtain picture signals consecutively, whereby recording a reproduction picture in a picture scanning reproducing machine such as a color scanner and a color facsimile, wherein a plurality of scanning lines on an original picture are scanned by a pickup lens at the same time per one rotation of an original picture cylinder to pick up the corresponding number of picture signals to that of the scanning lines.

4 Claims, 15 Drawing Figures

METHOD FOR SCANNING A PLURALITY OF SCANNING LINES AT THE SAME TIME

BACKGROUND OF THE INVENTION

The present invention relates to a method for scanning a plurality of scanning lines at the same time per one rotation of an original picture cylinder to pick up the corresponding number of picture signals to that of the scanning lines, whereby recording a reproduction picture in a picture scanning reproducing machine such as a color scanner and a color facsimile.

In a previously proposed picture scanning reproducing machine of a cylinder type such as a color scanner and a color facsimile, one scanning line is scanned each rotation of an original picture cylinder to obtain a picture signal. Accordingly, in order to pick up the picture signals quickly, the original picture cylinder is necessarily rotated at a high speed, and thus an arithmetic circuit having a high speed processing ability for performing color controls such as a color correction, a gradation control, and so forth, is required.

However, when the original picture cylinder is rotated at a higher speed than that presently carried out in order to save the pickup time for an original picture, the picture signals can not be exactly read out due to the insufficient strength of the light beam for scanning, and further the original picture is apt to be broken by a centrifugal force of the original picture cylinder while it is rotated. Therefore, it is quite difficult to rotate the original picture cylinder at the higher speed.

On the other hand, a layout scanner which can reproduce a plurality of reproduction pictures on a film with the desired reproduction scales in the desired layout positions from a plurality of original pictures, has been developed. In this case, the increase of the pickup speed of the picture signals from the original picture has been required as the technique advances.

SUMMARY OF THE INVENTION

It is an object of the present invention to provide a method for scanning a plurality of scanning lines at the same time per one rotation of an original picture cylinder to pick up the corresponding number of picture signals to that of the scanning lines, whereby recording a reproduction picture in a picture scanning reproducing machine such as a color scanner and a color facsimile, free from the aforementioned disadvantages and inconveniences, which can increase the pickup speed of the picture signals without increasing the rotation speed of the original picture cylinder and the response speed of the arithmetic circuit and which does not need a troublesome adjustment and is economical.

According to the present invention there is provided a method for scanning an original picture photoelectrically to obtain picture signals consecutively, whereby recording a reproduction picture in a picture scanning reproducing machine, the improvement which comprises the step of scanning a plurality of scanning lines at the same time per one rotation of an original picture cylinder by a pickup lens to pick up the corresponding number of picture signals to that of the scanning lines.

BRIEF DESCRIPTION OF THE DRAWINGS

In order that the present invention may be better understood, preferred embodiments thereof will be described with reference to the accompanying drawings, in which.

DESCRIPTION OF THE PREFERRED EMBODIMENTS

Figure 1:
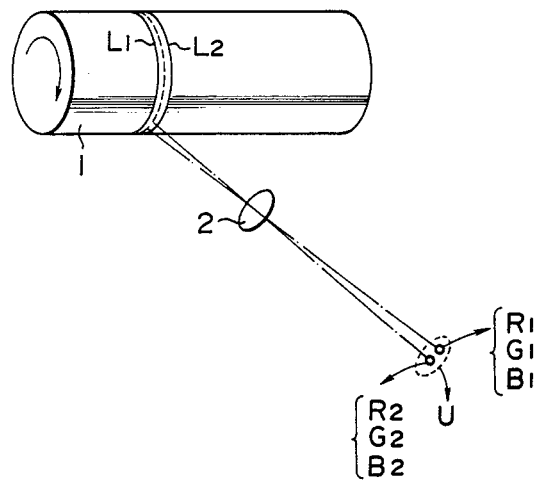
FIG. 1 is a schematic perspective view of an original picture cylinder and a pickup lens for explaining a principle of a method according to the present invention.

Referring now to the drawings, there are schematically shown in FIG. 1 an original picture cylinder 1 and a pickup lens 2, for explaining a principle of a method according to the present invention.

An original picture mounted to the original picture cylinder 1 is scanned photoelectrically by using a light beam, and two sets of color separation picture signals ($R_1$, $G_1$, $B_1$) and ($R_2$, $G_2$, $B_2$) for two minute picture elements corresponding to adjacent two scanning lines $L_1$ and $L_2$ are picked up at the same time by projecting the images of the two picture elements onto photoelectric converter elements by means of a pickup lens 2 and color separation filters.

On the other hand, an unsharp signal U for emphasizing a detail part of a reproduction picture reproduced according to the color separation picture signals ($R_1$, $G_1$, $B_1$) or ($R_2$, $G_2$, $B_2$) is obtained from the circumference of each picture element on the scanning line $L_1$ or $L_2$ corresponding to the color separation picture signals ($R_1$, $G_1$, $B_1$) or ($R_2$, $G_2$, $B_2$). Alternatively, an unsharp signal to be obtained from the circumference of the original picture including the two picture elements may be replaced with the two sets of the color separation picture signals ($R_1$, $G_1$, $B_1$) and ($R_2$, $G_2$, $B_2$) without any practical trouble, and to the contrary it is preferable for the construction.

Figure 2:
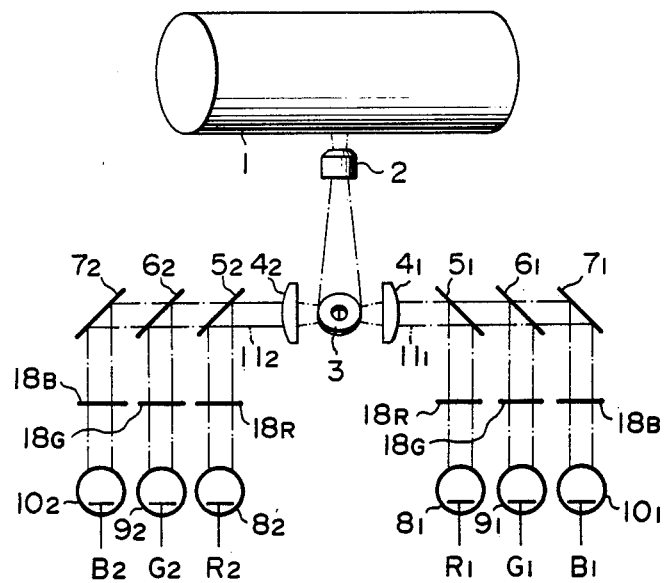
FIG. 2 is a fragmentary elevational view of an apparatus for performing a first embodiment of a method according to the present invention.
Figure 3:
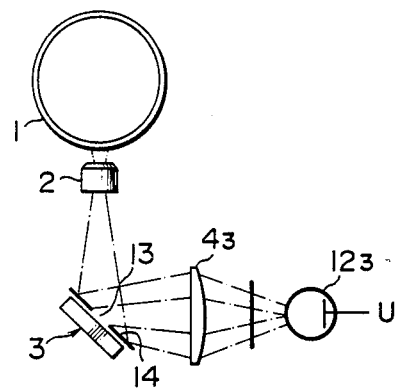
FIG. 3 is a side view of FIG. 2.

In FIGS. 2 and 3 there is shown an apparatus for performing the first embodiment of a method according to the present invention.

In this embodiment, the two adjacent scanning lines are photoelectrically scanned at the same time by the light beam in the original picture, alike the embodiment of FIG. 1, and the scanned part of the original picture, corresponding to the two scanning lines, is focused onto a light beam splitter 3 by a pickup lens 2 which are included in a pickup head (not shown).

Two embodiments of the light beam splitter 3 are shown in FIGS. 4a and 4b and 5a and 5b. The light beam splitter 3 comprises a mirror 14 having an elliptic or trapezoidal opening 13 in its center, and a saddle roof-shaped mirror 15 (see FIG. 4a) or a prism 16 (see FIG. 5a).

Figure 4A:
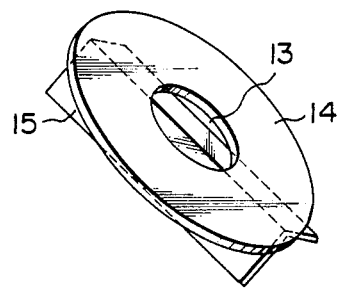
FIGS. 4a and 4b are enlarged perspective views of a first embodiment of a light beam splitter of FIGS. 2 and 3.
Figure 4B:
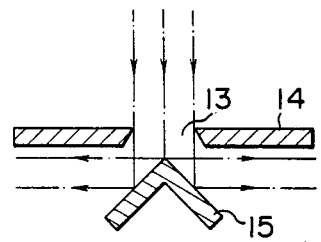
Figure 5A:
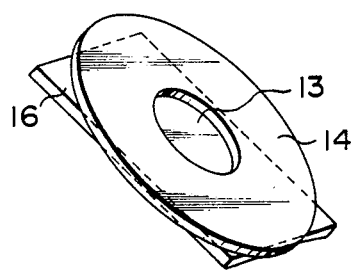
FIGS. 5a and 5b enlarged perspective views, alike FIGS. 4a and 4b of a second embodiment of a light beam splitter.
Figure 5B:
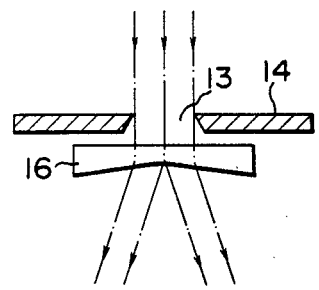

In the light beam splitter 3, only a sharp light beam corresponding to the two picture elements is passed through the opening 13 of the mirror 14. Thus the passed light beam is then divided into two light beams $11_1$ and $11_2$ corresponding to each picture element by the saddle roof-shaped mirror 15, as shown in FIG. 4b. The divided two light beams $11_1$ and $11_2$ are converged by lenses $4_1$ and $4_2$, respectively, are separated into three light beams for each by dichroic mirrors ($5_1$, $6_1$, $7_1$) and ($5_2$, $6_2$, $7_2$), and then are incident upon corresponding photoelectric converter elements ($8_1$, $9_1$, $10_1$) and ($8_2$, $9_2$, $10_2$) through color separation filters 18R, 18G and 18B. Then, the photoelectric converter elements ($8_1$, $9_1$, $10_1$) and ($8_2$, $9_2$, $10_2$) convert the light beams into electric signals, thereby outputting two sets of color separation picture signals ($R_1$, $G_1$, $B_1$) and ($R_2$, $G_2$, $B_2$) corresponding to the two scanning lines, as shown in FIG. 2.

Meanwhile, the unsharp signal U for emphasizing the detail part of the original picture is focused, as shown in FIG. 3, onto the mirror 14 around the opening 13, and is reflected to a lens $4_3$. The reflected light beam corresponding to the circumference of the two picture elements on the original picture is focused on a photoelectric converter element $12_3$ through a filter such as a spectral luminous efficiency equivalent filter, a color separation red or green filter and a neutral-density (ND) filter.

Then, while the unsharp signal U is fed to a pair of arithmetic circuits (not shown), the obtained two sets of color separation picture signals ($R_1$, $G_1$, $B_1$) and ($R_2$, $G_2$, $B_2$) are sent to the respective arithmetic circuits in which the color control such as color correction, detail emphasizing, and so forth, is carried out, thereby obtaining two sets of recording signals ($C_1$, $M_1$, $Y_1$, $K_1$) and ($C_2$, $M_2$, $Y_2$, $K_2$) for cyan, magenta, yellow and black, corresponding to the two scanning lines.

Therefore, when the original picture is scanned photoelectrically with the same accuracy and speed as those in the conventional method, the moving pitch of the pickup head in the direction of the cylinder's axis becomes twice as fast as that of the conventional method. That is, the moving speed of the pickup head in the direction of the cylinder's axis is raised twice.

The present method can be applied to a picture scanning reproducing machine such as a layout scanner which picks up two picture signals corresponding to two adjacent scanning lines, and which once stores a plurality of picture signals in a magnetic disc, or the like. In this embodiment, the picture signals corresponding to the two scanning lines are obtained at the same time each rotation of the picture cylinder. Thus, the input time of the data can be shortened conveniently.

Figure 6:
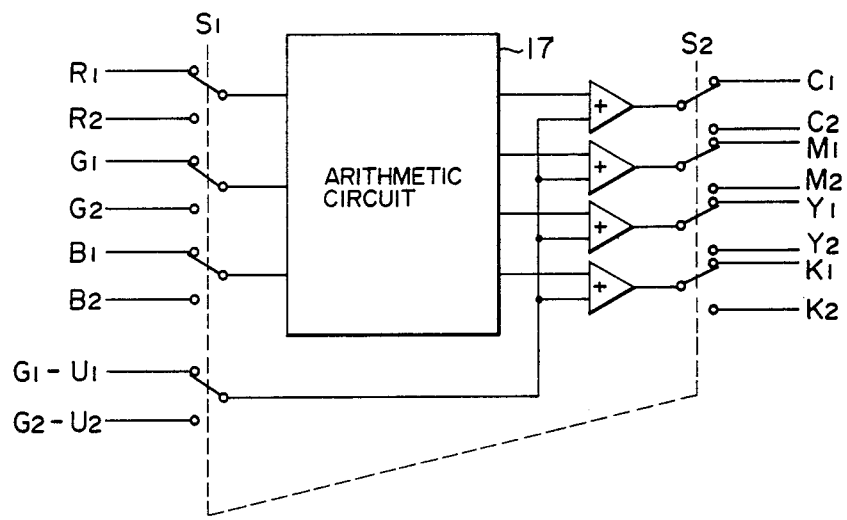
FIG. 6 shows an arithmetic circuit for use in a second embodiment of a method according to the present invention.

In FIG. 6 there is shown an arithmetic circuit for use in a second embodiment of a method according to the present invention, wherein a pickup head has the same construction as that of FIGS. 2 and 3.

In this embodiment, an arithmetic circuit 17 is used in common for processing the color separation picture signals which are picked up by the photoelectric converter elements, different from the first embodiment in which a plurality of arithmetic circuits are provided. In this case, the cost of the apparatus can be reduced, and the problems of the adjustment and the operativity of the apparatus can be removed largely.

In this embodiment, a group of associated input switches $S_1$ are connected to the arithmetic circuit 17 and another group of associated output switches $S_2$ are also connected to the same via adders. The input switches $S_1$ should, at least, be necessarily turned at a high speed, and the arithmetic circuit 17 should necessarily have a response speed of more than twice as fast as the conventional arithmetic circuit. In order to raise the response speed of the arithmetic circuit 17 more than twice, the arithmetic circuit 17 is composed of a look-up table memory, and a signal interpolating means such as one disclosed in the specification of Japanese Patent Application No. 56-93013. If it is difficult to perform at an interpolating speed twice as fast as the conventional arithmetic circuit, only the signal interpolating means may be provided in parallel.

It is determined whether it is necessary to change the output switches $S_2$ at a high speed, or not, depending on the form of the recording head in the picture scanning reproducing machine such as a color scanner. For example, when the recording head is adapted to expose two scanning lines at the same time, or the picture signals are once stored in a memory such as a magnetic disc in such a layout scanner, the output switches $S_2$ must be changed at the high speed. However, in a conventional picture scanning reproducing machine in which a reproduction picture is recorded every one scanning line while the recording cylinder is rotated at the speed twice as fast as the conventional one, a buffer memory is required and it is unnecessary to change the output switches $S_2$. Further, in such a layout scanner, it is possible to write the picture signals into a memory without changing the output switches $S_2$ and to read the desired picture signals consecutively out of the memory.

In a third embodiment of the present invention, which is obtained by improving the first and the second embodiments described above, the simplification of the structure of the apparatus and the processing of the color separation picture signals is carried out in consideration of the limit of the eyesight power of a human being. That is, concerning the visual sense of the human being, the resolving power of color (hue and color saturation) is considerably inferior to that of the brightness, and thus the picture signals for color can be somewhat roughly sampled as long as the resolving power of the detail signals is maintained at a certain level. This embodiment of the present invention utilizes this fact.

Figure 7:
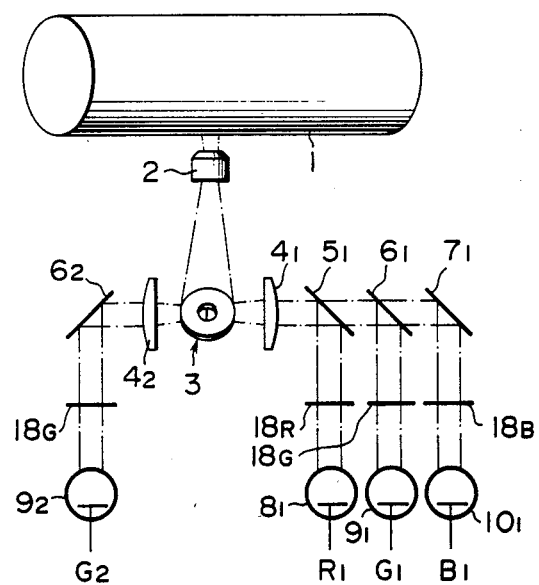
FIG. 7 is a fragmentary elevational view of an apparatus for performing a third embodiment of a method according to the present invention.
Figure 8:
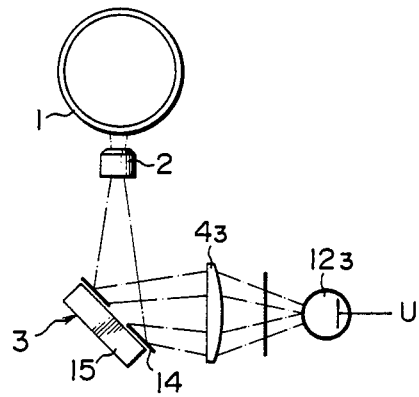
FIG. 8 is a side view of FIG. 7.

In FIGS. 7 and 8 there is shown another apparatus for performing the third embodiment of a method according to the present invention, wherein the same numerals as those of FIGS. 2 and 3 denote the same members.

As shown in FIG. 7, one of two light beams which are obtained by dividing a light beam corresponding to two scanning lines by a mirror 15, is converged by a lens $4_1$, and then is separated into three light leams by dichroic mirrors ($5_1$, $6_1$, $7_1$), in the quite same manner as the embodiment shown in FIG. 2. The separated three beams are incident to respective photoelectric converter elements ($8_1$, $9_1$, $10_1$) through three color separation filters 18R, 18G and 18B, and thereby the photoelectric converter elements ($8_1$, $9_1$, $10_1$) output a set of color separation picture signals ($R_1$, $G_1$, $B_1$). The other light beam corresponding to the other scanning line is converged by a lens $4_2$, is reflected by a dichroic mirror $6_2$ which reflects only a green color light beam, and is then incident upon a photoelectric converter element $9_2$ through a green color separation filter 18G. The photoelectric converter element $9_2$ converts the incident light beam to an electric signal, thereby obtaining a color separation picture signal $G_2$.

Figure 9:
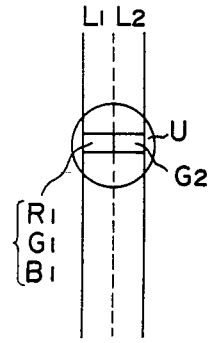
FIG. 9 shows scanning lines of an original picture, in an enlarged scale, according to the present invention.

On the other hand, as shown in FIG. 8, the unsharp signal U is obtained in quite the same manner as the embodiment of FIG. 3. That is, the light beam reflected by the mirror 14 of the light beam splitter 3 is focused on a photoelectric converter element 12 by a focusing lens 43, and thereby the photoelectric converter element $12_3$ outputs the unsharp signal U. As shown in FIG. 9, the thus obtained unsharp signal U is used in common for the color separation picture signals $R_1$, $G_1$, $B_1$ and $G_2$ corresponding to the two scanning lines $L_1$ and $L_2$.

Figure 10:
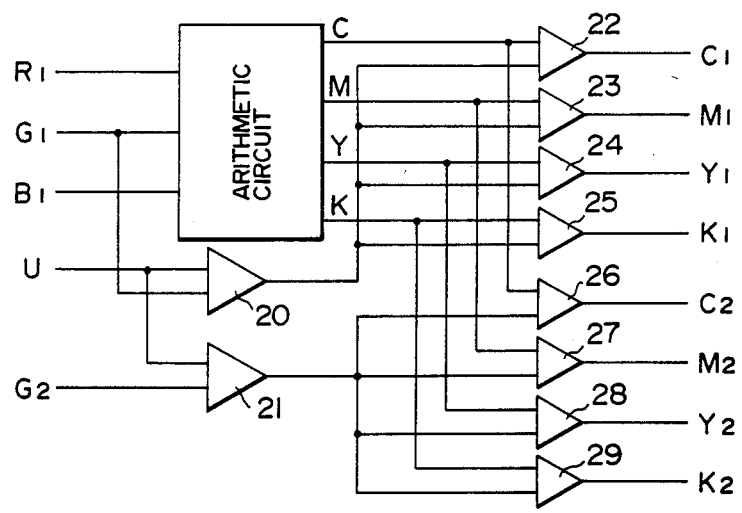
FIG. 10 shows another arithmetic circuit for use in a third embodiment of a method according to the present invention.

The obtained color separation picture signals $R_1$, $G_1$, $B_1$ and $G_2$, and the unsharp signal U are fed to a processing circuit which comprises an arithmetic circuit 17 and a plurality of differential amplifiers 20-29 in order to obtain recording signals ($C_1$, $M_1$, $Y_1$, $K_1$) and ($C_2$, $M_2$, $Y_2$, $K_2$) whose details are emphasized, corresponding to the two scanning lines, as shown in FIG. 10.

That is, considering of the fact that the resolving power of the human being realative to the color is fairly inferior to that relative to the brightness, detail signals for two sets of color separation picture signals are obtained from the green color separation picture signals $G_1$ and $G_2$ and the unsharp signal U, and the color separation picture signals $R_1$, $G_1$ and $B_1$ corresponding to the scanning line $L_1$ are used in common for the color components.

Figure 11:
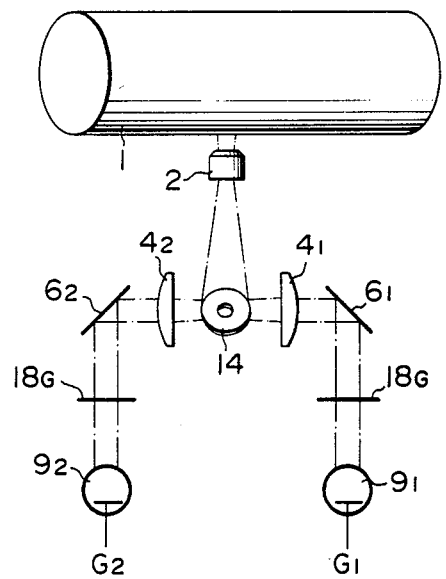
FIG. 11 is a fragmentary elevational view of an apparatus for performing a fourth embodiment of a method according to the present invention.
Figure 12:
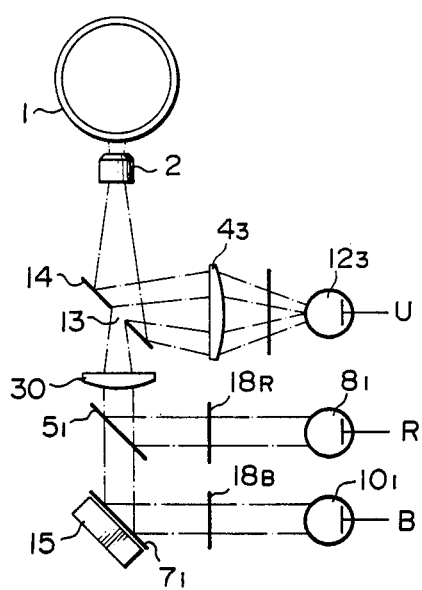
FIG. 12 is a side view of FIG. 11.

In FIGS. 11 and 12 there is shown still another apparatus for performing a fourth embodiment of a method according to the present invention.

Figure 13:
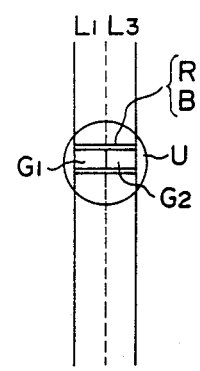
FIG. 13 shows scanning lines of an original picture, in an enlarged scale, alike FIG. 9.

In this embodiment, the green color separation picture signals $G_1$ and $G_2$ for preparing the detail signals are obtained corresponding to the respective scanning lines, as shown in FIG. 13, and the other color separation picture signals R and B which are to be used in common for the two scanning lines, are obtained from the light beam corresponding to the diameter of the scanning lines $L_1$ and $L_2$.

As shown in FIG. 12, in this embodiment, two dichroic mirrors $5_1$ and $7_1$ for the color separation picture signals R and B, and a condenser lens 30, if possible, are arranged between a mirror 14 and a saddle roof-shaped mirror 16 or a prism 16 which compose a light beam splitter 3. The light beam passed through the opening 13 of the mirror 14 is reflected consecutively by the dichroic mirrors $5_1$ and $7_1$. The reflected light beams are incident upon respective photoelectric converter elements $8_1$ and $10_1$ through the color separation filters 18R and 18B, and then the photoelectric converter elements $8_1$ and $10_1$ output the color separation picture signals R and B to be used in common for the two scanning lines $L_1$ and $L_2$. The unsharp signal U is obtained from the light beam reflected by the mirror 14 in the quite same manner as the embodiments shown in FIGS. 3 and 8. The light beam passed through the dichroic mirror $7_1$ is divided into two light beams by the mirror 15, and the divided two light beams are diverged by lenses $4_1$ and $4_2$, are reflected by dichroic mirrors $6_1$ and $6_2$, and then are incident upon the photoelectric converter elements $9_1$ and $9_2$ through the color separation filters 18G, respectively, in the same manner as described above, thereby obtaining the green color separation picture signals $G_1$ and $G_2$.

Thus the obtained color separation picture signals R, B, $G_1$ and $G_2$, and the unsharp signal U are sent to a processing circuit (not shown) having the similar construction to the one shown in FIG. 10 in order to obtain the detail-emphasized recording signals ($C_1$, $M_1$, $Y_1$, $K_1$) and ($C_2$, $M_2$, $Y_2$, $K_2$), in the manner similar to the embodiments described above.

Although the preferred embodiments have been described in an analog manner, however, the present invention can be, of course, realized in a digital manner. When the circuit is digitized, as disclosed in Japanese Patent Application No. 54-82571 (Japanese Patent Laying-Open Specification No. 56-8140), the emphasizing of the detail may be performed in a digital manner, resulting in omission of a photoelectric converter element for obtaining an unsharp signal.

It is readily understood from the description of the preferred embodiments of the present invention, although two sets of signals corresponding to the two scanning lines are obtained at the same time, however, more than two sets of signals can be obtained According to the present invention, instead of the photoelectric converter element, a photo-sensor array comprising another solid element such as charge-coupled devices (CCD), or the like, can be used. Further, the present invention can be applicable to a picture scanning reproducing machine of a flat scanning type.

Although the present invention has been described in some detail by way of illustration and example for purpose of clarity of understanding, it will, of course, be understood that various changes and modifications may be made in the form, details, and arrangements of the parts without departing from the scope of the present invention.

What is claimed is:

1. A method for scanning an original picture photoelectrically to obtain picture signals consecutively, whereby recording for a reproduction picture is accomplished in a picture scanning reproducing machine of a type in which the outer surface of an original picture cylinder is scanned, the improvement comprising the steps of:

scanning the outer surface of an original picture cylinder, said outer surface of said cylinder being scanned while said cylinder rotates;

scanning at least two scanning lines per one rotation of said original picture cylinder to pick up a number of picture signals corresponding to the number of scanned lines;

processing the picture signals obtained during said scanning from at least one said scanned line from optical to corresponding R, G and B electrical signals independently; and processing picture information obtained from the circumferential areas of a plurality of adjacent picture elements from optical to electrical signals, said picture information being picked up as unsharp signals concurrently with said scanning;

processing electronically said R,G and B signals to C,Y,M and K signals, and modifying at least a portion of said processed R, G and B signals by combining with signals derived from said concurrent unsharp signals.

2. A method as defined in claim 1, wherein the picture signals corresponding to the scanning lines, which are obtained at the same time, are processed in parallel by a circuit, part of the circuit being used in common on a timed/switching basis.

3. A method as defined in claim 1, wherein the picture signals corresponding to the scanning lines are processed in parallel by electrical circuits, said picture signals corresponding to one scanning line being substituted by said circuits into other picture signals corresponding to another of said at least two scanning lines.

4. A method for scanning an original picture photoelectrically to obtain picture signals consecutively in a picture scanning/reproducing machine wherein the original picture is mounted for scanning on a rotating cylinder, the improvement comprising the steps of:

collecting a beam of light reflected from at least two scanning lines during one rotation of said original picture cylinder;

splitting a first portion of said collected beam of light optically into separate beams corresponding respectively to each said scanning line;

optically splitting each said separated beam into R, G and B beams;

converting said R, G and B beams into corresponding independent electrical signals;

directing a second portion of said collected light to means for converting said second portion into electrical signals, said second portion being light obtained concurrently from circumferential areas adjacent said scanning lines as unsharp images;

processing electronically said R, G and B signals to C, Y, M and K signals, and modifying at least a portion of said processed R, G and B signals by combining with signals derived from said concurrent unsharp signals.

* * * * *

UNITED STATES PATENT AND TRADEMARK OFFICE
CERTIFICATE OF CORRECTION

PATENT NO. : 4,556,901

DATED : December 3, 1985

INVENTOR(S) : TAKASHI SAKAMOTO

It is certified that error appears in the above-identified patent and that said Letters Patent is hereby corrected as shown below:

Column 5, line 16, omit "12" and insert --$12_3$--.

Column 5, line 17 omit "43" and insert --$4_3$--.

Column 5, line 21, omit "scannihg" and insert --scanning--.

Signed and Sealed this

Twenty-eighth Day of October, 1986

[SEAL]

*Attest:*

DONALD J. QUIGG

*Attesting Officer*  *Commissioner of Patents and Trademarks*